June 29, 1926.
F. J. HINDERLITER
1,590,510
ECCENTRIC COMBINATION SOCKET
Filed August 17, 1925
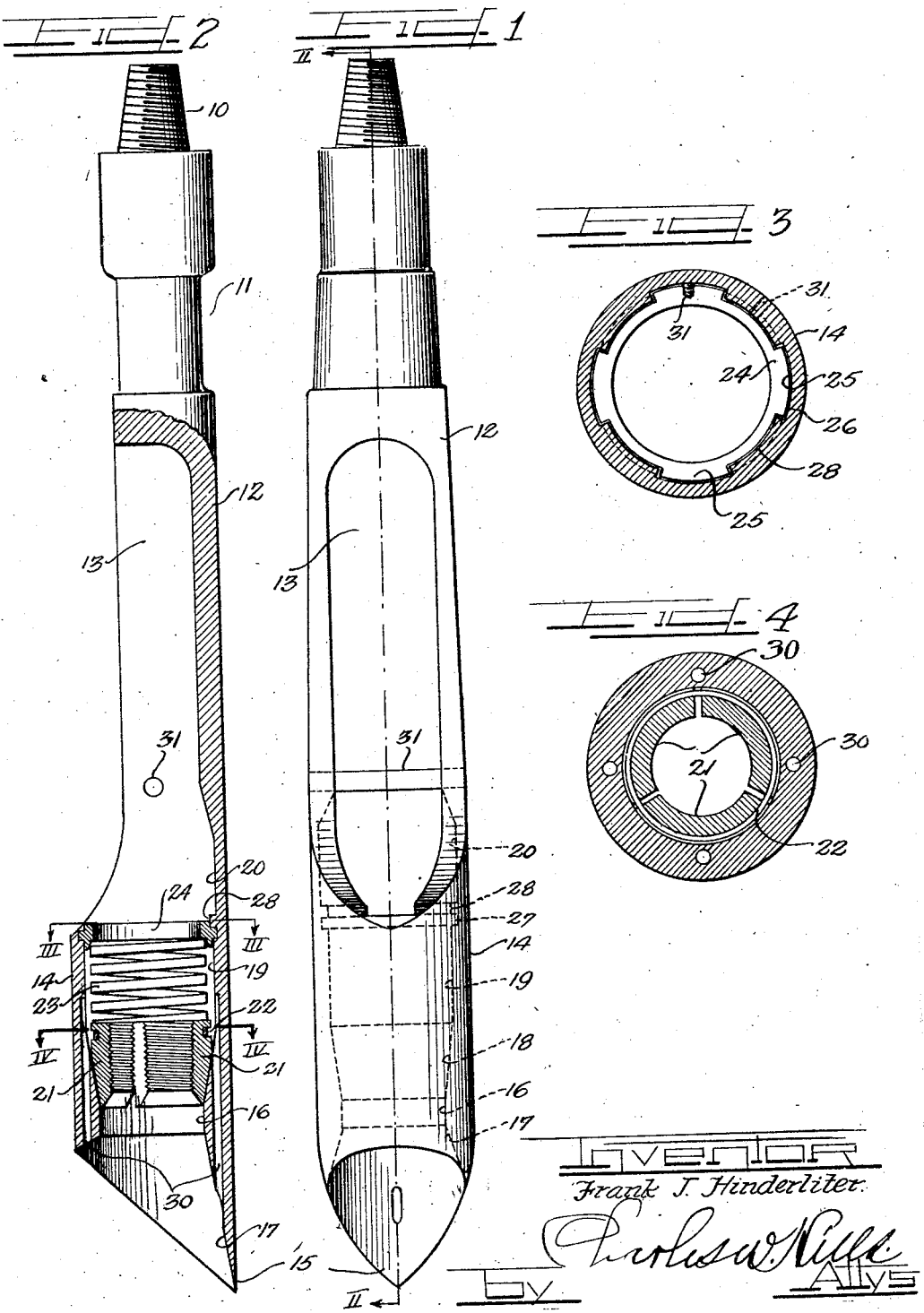

Patented June 29, 1926.

1,590,510

UNITED STATES PATENT OFFICE.

FRANK J. HINDERLITER, OF TULSA, OKLAHOMA.

ECCENTRIC COMBINATION SOCKET.

Application filed August 17, 1925. Serial No. 50,741.

This invention relates to fishing tools for recovering uncoupled or broken tools in well drilling operations, and is in part an improvement on the socket disclosed in my Patent No. 1,545,830, dated July 14th, 1925.

It is an object of this invention to provide by-pass passages around the gripping mechanism in the socket to relieve gas or fluid pressure after taking hold of a tool. In the smaller sizes of sockets very little clearance can be provided around the socket when running in the hole, and strong gas or fluid pressure would sustain the weight of the fishing tools and prevent lowering thereof. With the present eccentric socket a smaller offset pin provides ample space above the socket and the by-pass passages allow the escape of fluid around the gripping jaws even when engaged with the head of a lost string of tools.

It is another object of this invention to provide an improved readily removable retaining means for the spring urged gripping jaws adapted to be easily inserted and locked in position.

Other and further important objects of this invention will be apparent from the disclosures in the specification and the accompanying drawings.

This invention (in a preferred form) is illustrated in the drawings and hereinafter more fully described.

On the drawings:

Figure 1 is an elevation of a tool embodying features of this invention.

Figure 2 is a longitudinal section thereof on the line II—II of Figure 1.

Figure 3 is an enlarged cross section on the line III—III of Figure 2, showing the retaining ring in entering position.

Figure 4 is an enlarged cross section on line IV—IV of Figure 2 showing the by-passes in the socket leading past the gripping jaws.

As shown on the drawings:

A coupling pin is indicated by the numeral 10 intended to engage with a string of jars or rods for lowering into a drill hole. The usual collar 11 is provided next the pin 10 to receive a wrench. Integral with the pin and collar is a shank 12 preferably recessed or hollowed out as at 13 and extending to an offset socket 14 having its lower edge cut off at an angle with the lowermost point 15 thereof approximately aligned with the axis of the pin. The interior of the socket is bored out on a double taper extending both ways from the cylindrical portion 16, the lower taper 17 giving a bell mouth to the socket and the upper taper 18 being adapted to form a seat for the gripping mechanism and above this seat the socket has a cylindrical bore 19 slightly enlarged at 20 and extending up to meet the hollowed out part 13 of the shank 12. The gripping mechanism comprises a number of jaw like segments 21 the inner surfaces of which are serrated and the outer surfaces tapered to conform to the taper of the seating surface 18. A groove is turned in the outer surfaces of these segments to receive a snap ring 22 which preserves the alignment thereof while not interfering with the expansion of the segments when being forced down over the head of a tool. The segments are urged downward in the taper seat, to cause contraction thereof, by the spring 23 which abuts against a retaining ring 24 having a plurality of outstanding ears or lugs 25 which fit in the larger diameter 20 of the socket and in the position shown in Figure 3 pass through the slots 26 into the groove 27 whereupon a partial rotation of the ring brings the lugs under the remaining segments of the shelf 28 above the groove 27 where it is locked in place by the screw 29.

The socket is of course made of the largest possible diameter to go down the hole so that the presence of gas or fluid therein interferes with lowering the socket and again in hoisting the socket after gripping the tool; as the head of the tool fills up the interior of the socket. By-pass passages 30 are accordingly provided in the walls of the socket leading past the jaws to relieve this gas pressure.

A pin 31 is provided to prevent the lost tools from being forced too far up into the socket.

The position of the point 15 approximately aligned with the pin 10 strengthens the socket in use and permits the use thereof to clean out a hole while not interfering with the normal swing out of the tool when entering an enlargement or cave in the bore of the hole being drilled.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a combination socket, an expansible gripping mechanism comprising serrated jaws, a spring normally contracting said jaws and a retaining ring for said spring having outstanding lugs adapted to engage in suitable recesses in the socket wall by a partial rotation of said ring.

2. In a combination socket, an expansible gripping mechanism comprising serrated jaws, gas relief passages in the wall of said socket by-passing said jaws, a spring normally contracting said jaws and a retaining ring for said spring having outstanding lugs adapted to engage in suitable recesses in the socket wall by a partial rotation of said ring.

3. In a socket of the class described, gripping means therein, and passages in the walls of said socket leading past the gripping means.

4. In a socket of the class described, gripping means therein, passages in the walls of said socket leading past the gripping means, and retaining means for said gripping means including a removable ring having lugs adapted to engage in recesses in said socket.

5. In an eccentric combination socket, a socket offset with respect to the supporting point thereof, the lower end of said socket being formed at an angle with the lowermost point thereof aligned with the supporting point gripping means in said socket for engaging the head of a lost tool and by-pass passages in the walls of said socket leading past said gripping means.

In testimony whereof I have hereunto subscribed my name.

FRANK J. HINDERLITER.